(12) United States Patent
Gottschlich et al.

(10) Patent No.: US 9,830,196 B2
(45) Date of Patent: Nov. 28, 2017

(54) METHODS AND APPARATUS TO MANAGE CONCURRENT PREDICATE EXPRESSIONS

(71) Applicant: Intel Corporation, Santa Clara, CA (US)

(72) Inventors: Justin E. Gottschlich, Fort Collins, CO (US); Cristiano Ligieri Pereira, Groveland, CA (US); Gilles Pokam, Livermore, CA (US); Youfeng Wu, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/833,315

(22) Filed: Aug. 24, 2015

(65) Prior Publication Data

US 2015/0363242 A1 Dec. 17, 2015

Related U.S. Application Data

(63) Continuation of application No. 13/827,121, filed on Mar. 14, 2013, now Pat. No. 9,117,021.

(51) Int. Cl.
*G06F 9/52* (2006.01)
*G06F 11/36* (2006.01)

(52) U.S. Cl.
CPC ............ *G06F 9/52* (2013.01); *G06F 11/3632* (2013.01)

(58) Field of Classification Search
CPC ................................ G06F 9/52; G06F 11/3632
USPC .......................................................... 718/106
See application file for complete search history.

(56) References Cited

U.S. PATENT DOCUMENTS

| 6,009,269 A | 12/1999 | Burrows et al. |
|---|---|---|
| 7,100,157 B2 | 8/2006 | Collard |
| 7,316,005 B2 | 1/2008 | Qadeer et al. |
| 7,539,979 B1 | 5/2009 | Nir-Burchbinder |
| 7,673,181 B1 | 3/2010 | Lindo et al. |
| 8,356,287 B2 | 1/2013 | Tzoref et al. |
| 8,510,722 B2 | 8/2013 | Yang et al. |
| 8,572,606 B1 | 10/2013 | Agesen et al. |
| 9,117,021 B2 * | 8/2015 | Gottschlich ............... G06F 9/52 |
| 9,311,143 B2 | 4/2016 | Gottschlich et al. |
| 2002/0035722 A1 | 3/2002 | McKinsey et al. |
| 2003/0233394 A1 | 12/2003 | Rudd et al. |
| 2005/0102681 A1 | 5/2005 | Richardson |
| 2005/0177775 A1 | 8/2005 | Qadeer et al. |

(Continued)

OTHER PUBLICATIONS

United States Patent and Trademark Office, "Notice of Allowance," issued in connection with U.S. Appl. No. 13/994,063, dated Dec. 4, 2015 (11 pages).

(Continued)

*Primary Examiner* — John Chavis
(74) *Attorney, Agent, or Firm* — Hanley, Flight & Zimmerman, LLC

(57) ABSTRACT

Methods, apparatus, systems and articles of manufacture are disclosed to manage concurrent predicate expressions. An example method discloses inserting a first condition hook into a first thread, the first condition hook associated with a first condition, inserting a second condition hook into a second thread, the second condition hook associated with a second condition, preventing the second thread from executing until the first condition is satisfied, and identifying a concurrency violation when the second condition is satisfied.

20 Claims, 9 Drawing Sheets

(56) References Cited

U.S. PATENT DOCUMENTS

| | | |
|---|---|---|
| 2006/0161897 A1 | 7/2006 | Biberstein et al. |
| 2007/0168986 A1 | 7/2007 | Pangburn |
| 2008/0201629 A1 | 8/2008 | Duesterwald et al. |
| 2008/0250422 A1 | 10/2008 | Lewis |
| 2009/0100432 A1 | 4/2009 | Holloway et al. |
| 2009/0113399 A1 | 4/2009 | Tzoref et al. |
| 2009/0125887 A1 | 5/2009 | Kahlon et al. |
| 2009/0178044 A1 | 7/2009 | Musuvathi et al. |
| 2009/0235262 A1 | 9/2009 | Ceze et al. |
| 2010/0050161 A1 | 2/2010 | Nir-Burchbinder et al. |
| 2010/0070955 A1 | 3/2010 | Kahlon |
| 2010/0131931 A1 | 5/2010 | Musuvathi et al. |
| 2010/0281469 A1 | 11/2010 | Wang et al. |
| 2011/0022893 A1 | 1/2011 | Yang et al. |
| 2011/0131550 A1 | 6/2011 | Burckhardt et al. |
| 2011/0161590 A1 | 6/2011 | Guthrie et al. |
| 2011/0173422 A1 | 7/2011 | Chen et al. |
| 2011/0173592 A1 | 7/2011 | Elnozahy et al. |
| 2011/0258421 A1 | 10/2011 | Elnozahy et al. |
| 2012/0017221 A1 | 1/2012 | Hankins et al. |
| 2012/0102470 A1 | 4/2012 | Yang et al. |
| 2012/0144372 A1 | 6/2012 | Ceze et al. |
| 2012/0174074 A1 | 7/2012 | Ganai |
| 2012/0204062 A1 | 8/2012 | Erickson et al. |
| 2012/0204154 A1 | 8/2012 | Li et al. |
| 2013/0031531 A1 | 1/2013 | Keynes et al. |
| 2013/0097136 A1 | 4/2013 | Goldberg |
| 2014/0007054 A1 | 1/2014 | Wu et al. |
| 2014/0108860 A1 | 4/2014 | Agesen et al. |
| 2014/0115604 A1 | 4/2014 | Gottschlich et al. |
| 2014/0282423 A1 | 9/2014 | Gottschlich et al. |
| 2015/0363242 A1* | 12/2015 | Gottschlich ............... G06F 9/52 718/106 |
| 2016/0224457 A1 | 8/2016 | Gottschlich et al. |

OTHER PUBLICATIONS

International Search Authority, "International Preliminary Report on Patentability," issued in connection with International Patent Application No. PCT/US2014/011424, dated Sep. 24, 2015 (6 pages).

European Patent Office, "Extended European Search Report," issued in connection with European Patent Application No. 11878226.7, dated Aug. 24, 2015 (7 pages).

Campbell et al., "Path Expressions in Pascal," Procceedings of the 4th International Conference on Software Engineering (ICSE) 1979, IEEE Press, Piscataway, NJ (8 pages).

Ceze et al., "A Case for System Support for Concurrency Exceptions," USENIX Conference, Mar. 2009 (6 pages).

Dinsdale-Young et al., "Concurrent Abstract Predicates," ECOOP 2010, Lecture Notes in Computer Science, vol. 6183, 2010 (25 pages).

Gottschlich et al., "Concurrent Predicates: Finding and Fixing the Root Cause of Concurrency Violations," USENIX Hotpar 2012, Berkeley, CA 2012 (7 pages).

International Search Authority, "The International Search Report and Written Opinion," issued in connection with International Patent Application No. PCT/US2014/011424, mailed Apr. 29, 2014 (9 pages).

International Search Authority, "The International Search Report," issued in connection with International Patent Application No. PCT/US2011/066520, mailed Aug. 31, 2012 (5 pages).

International Search Authority, "Written Opinion," issued in connection with International Patent Application No. PCT/US2011/066520, mailed Aug. 31, 2012 (5 pages).

Park et al., "Concurrent Breakpoints," Electrical Engineering and Computer Sciences, University of California at Berkeley, Technical Report No. UCB/EECS-2011-159, Dec. 18, 2011 (15 pages).

Schwartz-Narbonne et al., "Parallel Assertions for Debugging Parallel Programs," Princeton University, IEEE, 2011 (10 pages).

Siegel et al., "Collective Assertions," Verification, Model Checking, and Abstract Interpretation: 12th International Conference, VMCAI 2011, vol. 6538 of Lecture Notes in Computer Science, Jan. 2011 (17 pages).

United States Patent and Trademark Office, "Non-Final Office Action," issued in connection with U.S. Appl. No. 13/535,334, dated Feb. 13, 2014 (15 pages).

United States Patent and Trademark Office, "Notice of Allowance," issued in connection with U.S. Appl. No. 13/535,334, dated Dec. 19, 2014 (10 pages).

United States Patent and Trademark Office, "Notice of Allowance," issued in connection with U.S. Appl. No. 13/535,334, dated Aug. 27, 2014 (8 pages).

United States Patent and Trademark Office, "Notice of Allowance," issued in connection with U.S. Appl. No. 13/535,334, dated May 26, 2015 (9 pages).

United States Patent and Trademark Office, "Non-Final Office Action," issued in connection with U.S. Appl. No. 131827,121, dated Jul. 7, 2014 (39 pages).

United States Patent and Trademark Office, "Notice of Allowance" issued in connection with U.S. Appl. No. 13/827,121, dated Mar. 30, 2015 (10 pages).

United States Patent and Trademark Office, "Non-Final Office Action," issued in connection with U.S. Appl. No. 13/994,063, dated Apr. 27, 2015 (31 pages).

Wikipedia, "Happened-before," last modified Jul. 9, 2012, retrieved from <http://en.wikipedia.org/wiki/Happened-before>, retrieved on Jan. 16, 2013 (2 pages).

Wikipedia, "Java Memory Model," last modified Nov. 3, 2012, retrieved from <http://en.wikipedia.org/wiki/Java_Memory_Model>, retrieved on Jan. 16, 2013 (3 pages).

Burckhardt et al.,"A Randomixed Scheduler with Probabilistic Guarantees of Finding Bugs," ASPLOS' 10, Mar. 13-17, 2010, Pittsburgh, Pennsylvania, USA, 12 pages.

United States Patent and Trademark Office, "Non-Final Office Action," issued in connection with U.S. Appl. No. 14/836,103, dated Nov. 22, 2016, 21 pages.

United States Patent and Trademark Office, "Final Office Action," issued in connection with U.S. Appl. No. 14/836,103, dated Mar. 23, 2017, 24 pages.

United States Patent and Trademark Office, "Non-Final Office Action," issued in connection with U.S. Appl. No. 14/836,103, on Aug. 25, 2017, 22 pages.

* cited by examiner

| | | |
|---|---|---|
| 202 | P1 < P2 | P1 satisfaction happens-before P2 satisfaction |
| 204 | P1 <& P2 | P1 satisfaction happens-before and stays true until P2 |
| 206 | P1 && P2 | (P1 <& P2) or (P2 <& P1) |
| 208 | P1 \|\| P2 | P1 is satisfied or P2 is satisfied |
| 210 | P1 # N | P1 is satisfied N times |
| 212 | P1 ^ N | P1 is satisfied N times concurrently |

FIG. 2

| Order | Predicate Name | Predicate Value | Concurrency Flag | Concurrency Value | Satisfied |
|---|---|---|---|---|---|
| 1 | P1 | 1 | True | P2 | True |
| 2 | P2 | 1 | False | P1 | TBD |
| 3 | P3 | 0 | True | n/a | TBD |
| 4 | P4 | 1 | True | n/a | TBD |
| 5 | n/a | ... | ... | ... | ... |
| ... | ... | ... | ... | ... | ... |
| ... | ... | ... | ... | ... | ... |

FIG. 5

METHODS AND APPARATUS TO MANAGE CONCURRENT PREDICATE EXPRESSIONS

RELATED APPLICATIONS

This patent arises from a continuation of U.S. patent application Ser. No. 13/827,121 (now U.S. Pat. No. 9,117, 021), entitled "Methods and Apparatus to Manage Concurrent Predicate Expressions," filed on Mar. 14, 2013, which is hereby incorporated herein by reference in its entirety.

FIELD OF THE DISCLOSURE

This disclosure relates generally to multi-threaded debugging, and, more particularly, to methods and apparatus to manage concurrent predicate expressions.

BACKGROUND

In recent years, multi-core processors have established a presence in the electronic devices market to improve the performance of computers, tablets, mobile telephones and/or vehicle computer systems. To take advantage of computing platforms and/or devices that have multiple cores and/or multiple processors, the code executing on such systems/devices needs to increase (e.g., maximize) opportunities to allow each available core or processor to execute independently of any other core or processor. Some code developers and/or software engineers refer to multi-core/multi-processor code development as parallel programming.

BRIEF DESCRIPTION OF THE DRAWINGS

FIG. 2 is a table of example concurrent predicate expression operators and corresponding definitions to identify concurrency violations in multi-threaded programs.

FIG. 5 is an example data structure to manage monitoring of concurrent predicate expressions in multi-threaded programs.

DETAILED DESCRIPTION

Figure 1:
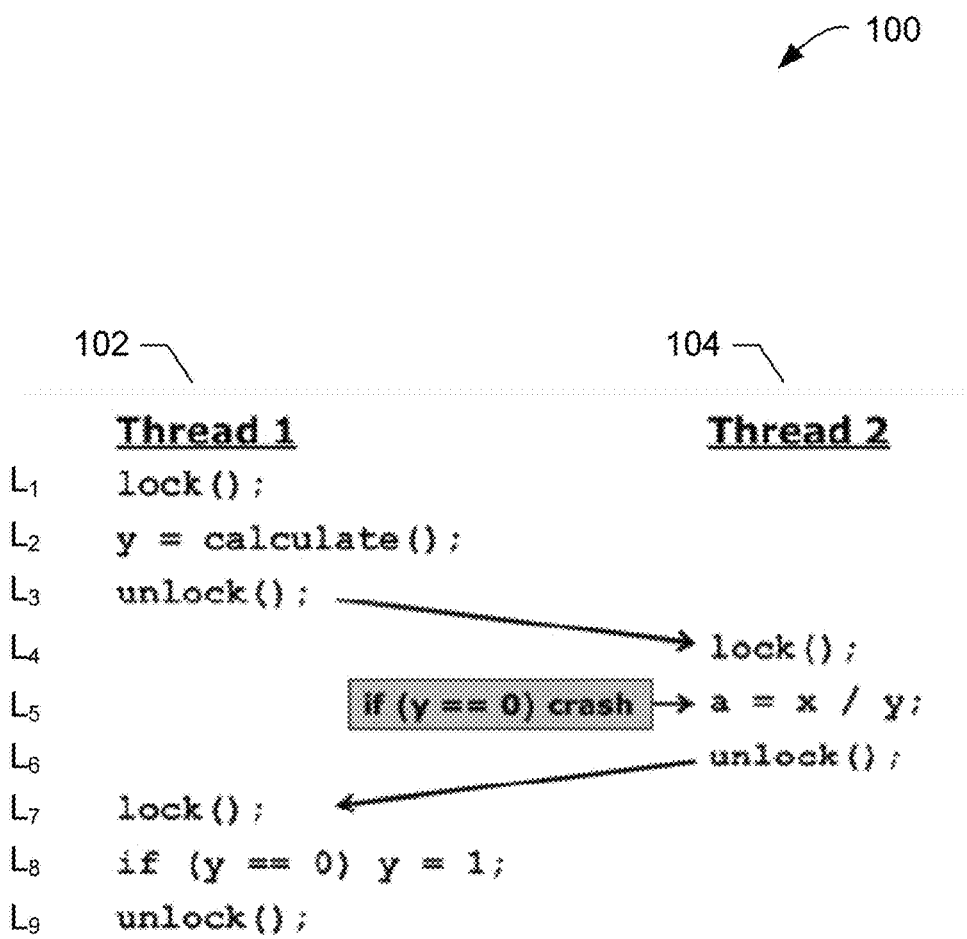
FIG. 1 illustrates an example pseudo code program having two threads.

Example computing platforms contain a central processing unit (CPU), such as a microprocessor, which communicates with one or more memories of the computing platform and executes instructions specified by software (code) to perform one or more computing tasks. Some example computing platforms and/or devices employ multiple processors (e.g., CPUs) in the same computer system/device. Each of the multiple processors may communicate with the memory and execute instructions in a manner independent of any other processor, thereby allowing the one or more computing tasks to be completed sooner when compared to computing platforms/devices having only a single processor. Some example processors contain two or more cores, in which each core may operate as a separate CPU contained on a single physical processor package and execute instructions in a manner independent of other cores of the processor package. A computing system and/or device may employ any combination of multiple processors and/or multiple cores to increase a number of available CPUs, thereby improving system/device performance when compared to single CPU systems/devices.

Device and/or platform architectures that employ multiple CPUs, via multiple processor chips and/or via one or more processor chips having multiple cores, facilitate improved performance when parallel programming properly manages each processor/core. In the interest of brevity, and as used herein, cores may refer to multiple processors in separate integrated circuit packages and/or processors having two or more cores contained within a single physical processor package. Also in the interest of brevity, devices, platforms and platform architectures will be referred to herein interchangeably. While parallel programming may facilitate simultaneous use of separate cores, such parallel programming may result in non-deterministic problems. A program is non-deterministic when it has identical inputs for two or more executions (e.g., two or more threads) on separate cores, but the outcomes are different. Such circumstances are particularly evident when a parallel program returns non-deterministic results when two or more threads access the same memory location without synchronization and at least one of the accesses is a write operation. For instance, when two or more separate threads execute at substantially the same time and use the same variable stored in a shared memory. For example, a first thread may calculate a first value for a variable. However, because a second thread is executing independently of the first thread, the variable value might be accessed and processed (e.g., changed) by the second thread at any time. Thus, the first thread may calculate, for example, a value of zero for a variable, store the result in memory, and then the second thread might process the variable as a denominator of a division operation, thereby invoking a divide-by-zero error for the platform.

The above example identifies one of many circumstances in which proper operation of a multi-threaded program requires that one or more operations of a particular thread are performed in a specific order relative to operations of one or more other threads. For example, two or more example threads that access the same memory location may rely on a specific value being present in the shared memory location to prevent erroneous behavior (e.g., an incorrect value, a divide-by-zero error, etc.) of the platform. Errors related to a thread instruction relative to a separate thread instruction are referred to herein as concurrency errors and/or concurrency violations. Fixing concurrency errors typically involves reproducing a bug responsible for the concurrency errors when two or more threads execute on a platform. Debugging in the context of a serial program (i.e., a program that executes using only one thread) may be relatively straightforward because a process of sequentially stepping through lines of code eventually reveals the bug. On the other hand, sequentially stepping through a parallel program, where two or more threads are active, may or may not reveal the bug based on the second or other threads. The order of execution of code between the first thread and the second thread may differ based on any number of factors such as, for example, relative differences of thread initialization times and differing inputs associated with the first and/or second thread that may cause differing execution durations. To ensure deterministic parallel program execution, the use of synchronization techniques is applied. For example, synchronization may be employed via locks, transactions, monitors, barriers, mutexes, etc. However, when synchronization is not used and/or when used incorrectly/improperly, non-determinism may result. Bugs that do not occur upon every execution of a program (e.g., a block of code) are referred to as non-deterministic.

FIG. 1 illustrates an example multi-threaded application 100 (a program written in pseudo code) in which concurrently executing threads may result in platform failure. In the illustrated example of FIG. 1, a first thread 102 includes six (6) lines of code (i.e., $L_1$-$L_3$ and $L_7$-$L_9$), and a second thread 104 includes three (3) lines of code (i.e., $L_4$-$L_6$). In the event the first thread 102 begins execution first, a lock is acquired at line $L_1$ to prevent one or more other threads (e.g., the second thread 104) from accessing variable y at line $L_2$. A value for variable y is calculated at line $L_2$ before an unlock operation is performed at $L_3$ to relinquish access of variable y for one or more other threads. However, if the example first thread 102 calculates a value of zero for variable y, then the example second thread 104 will incur a divide-by-zero error at line $L_5$.

The above example divide-by-zero concurrency bug is particularly difficult to detect because the example platform executing the first thread 102 and the second thread 104 may not always begin with line $L_1$ of the first thread 102. In some examples, the second thread 104 may begin execution before any code of the first thread 102, which would not result in a divide-by-zero error when the value of variable y is non-zero. In other examples, all of lines $L_1$-$L_3$ and $L_7$-$L_9$ may execute in the first thread 102 before line $L_4$ of the second thread 104 begins executing, in which case the divide-by-zero error will not occur because the value of variable y is reset to 1 when the first thread detects a zero value (see lines $L_7$-$L_9$). The first thread 102 and the second thread 104 may not execute in a synchronous manner with respect to each other, which may result in a concurrency bug occurring in some instances and not in other instances. In still another example, the first thread 102 and the second thread 104 may operate in a synchronous manner with respect to each other, where calculate( ) always returns 0 or never returns 0, such that a bug will always occur or never occur.

The example synchronous manner between the first thread 102 and the second thread 104 may occur based on homogeneous and/or non-transient conditions of a corresponding computing platform (e.g., all platform inputs are static). In such circumstances in which the first thread 102 and the second thread 104 operate in a relatively synchronous manner without detecting and/or otherwise observing platform error(s), a false sense of security may result in the release and/or deployment of unstable code. In other examples, transient conditions and/or inputs associated with the platform, the first thread 102 and/or the second thread 104 may cause intermittent occurrence of concurrency bugs.

To troubleshoot (debug) multi-threaded code, example methods, apparatus, systems and/or articles of manufacture are disclosed herein insert one or more expressions into code to test for concurrency violations. As disclosed herein, concurrent predicate expressions (CPEs) are inserted into code under evaluation (e.g., the first thread 102 and the second thread 104) to detect conditions that are sufficient to reproduce a concurrency error (bug). In some circumstances, an order of particular conditions (concurrency) must be satisfied before a violation/bug (e.g., a concurrency bug) occurs, in which the particular conditions are sometimes referred to herein as happens-before relationships. In other words, a temporal order of a condition from a first thread (e.g., the first thread 102) and a second thread (e.g., the second thread 104) must be satisfied for the concurrency bug to occur. The required conditions are referred to as predicates, which are Boolean conditions that return true or false. An expression of a CPE reflects a group of ordered predicates.

The example CPE may be converted by a compiler into executable code and/or instructions to control scheduling of threads of a multi-threaded program and/or to locate portions of code in which violations occur. In the illustrated example of FIG. 2, several example CPE definitions 200 having different operators are shown. A first example expression 202 (p1<p2) includes a first predicate p1, a second predicate p2 and an operator "<." The first example expression 202 illustrates that predicate p1 must be satisfied prior to the satisfaction of p2. In other words, a Boolean condition associated with the first predicate p1 (e.g., variable y=0) must occur temporally earlier than a Boolean condition associated with the second predicate p2. Additionally, example methods, apparatus, systems and/or articles of manufacture disclosed herein will not pay any attention to the status of p2 unless and until p1 is satisfied.

A second example expression 204 (p1<& p2) also includes the first and second predicates p1 and p2, and includes an operator "<&." The second example expression 204 illustrates that predicate p1 must be satisfied prior to the satisfaction of p2, and must stay true until the moment that p2 is satisfied. A third example expression 206 (p1 && p2) illustrates a reciprocal concurrent expression where (1) p1 is satisfied and stays true until p2 is satisfied, or (2) p2 is satisfied and stays true until p1 occurs and is satisfied. A fourth example expression 208 (p1∥p2) illustrates a reciprocal non-concurrent expression where either p1 is satisfied or p2 is satisfied. A fifth example expression 210 (p1 # N) illustrates an expression where p1 must be satisfied a threshold number of times indicated by an integer N. A sixth example expression 212 (p1^N) illustrates an expression where p1 is satisfied a threshold number of times concurrently.

Figure 3:
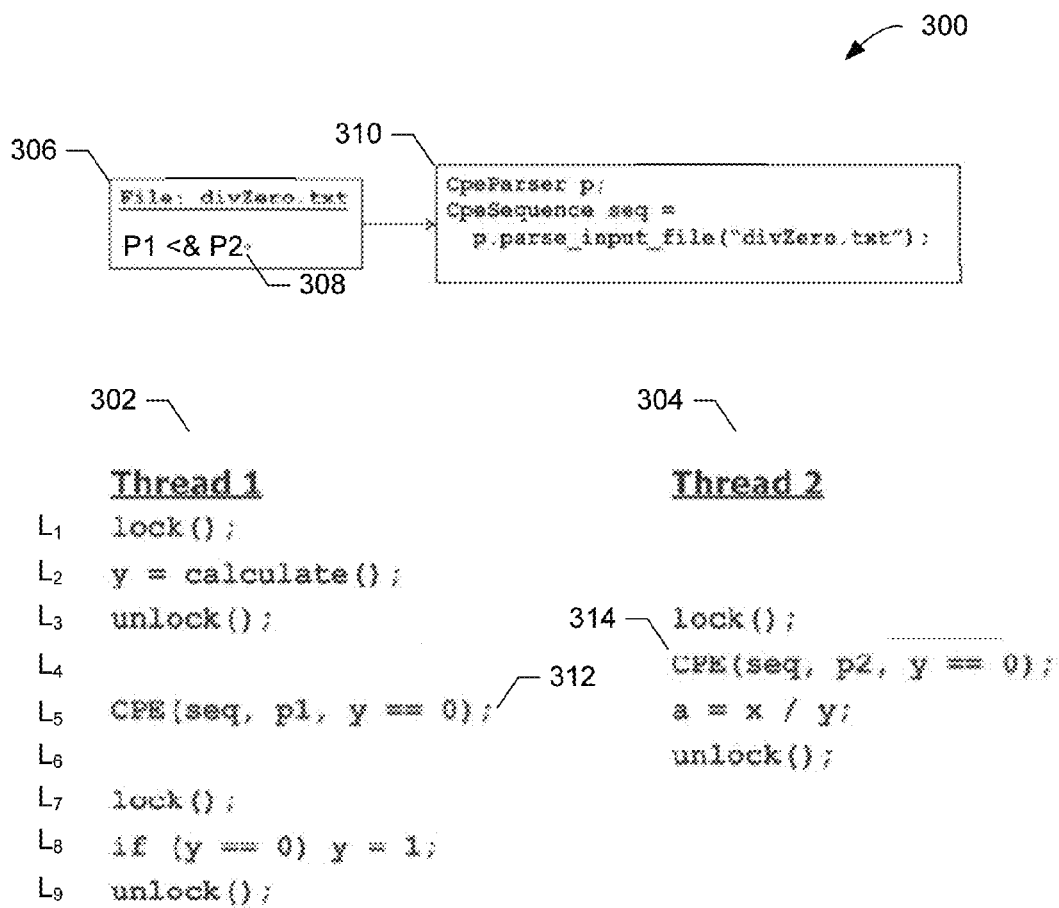
FIG. 3 illustrates an example pseudo code program having two threads using concurrent predicate expressions to identify concurrency violations.

To illustrate utilization of a CPE, FIG. 3 illustrates an example multi-threaded application 300 (e.g., a program) that is substantially the same as the example multi-threaded application 100 of FIG. 1. In the illustrated example of FIG. 3, a first thread 302 and a second thread 304 include lines of code labeled $L_1$ through $L_9$. While the code of the first thread 302 and the second thread 304 are compiled by a compiler prior to execution, the example auxiliary file 306 includes a CPE 308 that is not compiled. Instead, the example auxiliary file 306 is parsed in response to parsing instructions 310, as described in further detail below. The example CPE 308 indicates that a first predicate p1 must be satisfied prior to a second predicate p2 before the occurrence of a bug is confirmed.

In the event a bug is believed to be located in the first thread 302, an example first CPE hook 312 (condition hook) is inserted at line L5, and in the event a bug is believed to be located in the second thread 304, an example second CPE hook 314 (condition hook) is inserted at line L4. The example first CPE hook 312 is associated with predicate p1, and the example second CPE hook 314 is associated with predicate p2. A software engineer and/or any other personnel or entity chartered with the responsibility of debugging code may not know whether potential code bugs/violations require a particular order and/or concurrency relationship. Accordingly, the example CPE 308 (p1 <& p2) in the auxiliary file 306 indicates that predicate p1 must be satisfied and stay true until predicate p2 is satisfied. Although the example CPE 308 may not reflect the correct conditions required to invoke a bug, the CPE 308 may be altered and/or otherwise replaced in the example auxiliary file 306 so that alternate concurrency testing may occur without the need to recompile the example first thread 302 or the example second thread 304. In some examples, when a first predicate expression (e.g., CPE 308) is not satisfied at a first time, the first predicate expression is replaced in a non-compiled auxiliary file (e.g., file 306) with a second predicate expression. In some examples, the second predicate expression is invoked during execution of a first (e.g., thread 302) and a second thread (e.g., thread 304) at a second time to identify a predicate order responsible for a thread concurrency error.

In operation, if the first thread 302 begins execution, a lock is obtained at line $L_1$ to prevent the second thread 304 (or any other thread) from accessing shared memory where variable y (see line $L_2$) is located. The example first thread 302 calculates a value for variable y at line $L_2$ and releases the lock at line $L_3$ to allow any other thread to access the shared memory associated with variable y. Line L5 is evaluated and because it is associated with predicate p1, the conditions associated with p1 are evaluated based on the example CPE 308 of the example auxiliary file 306. For the purposes of this example, assume that the calculation of variable y in line L2 of the first thread 302 resulted in a value of zero. In this example scenario, the first CPE hook 312 confirms that the conditions of y=0 are true, thereby allowing the second CPE hook 314 of the second thread 304 to be evaluated. However, because the example CPE 308 indicates that predicate p1 must not only be true prior to predicate p2, but must also stay true until predicate p2 is evaluated to be true, example methods, apparatus, systems and articles of manufacture disclosed herein will refrain from evaluating the conditions of predicate p2 in the event the value of variable y changes from zero to a non-zero value.

Continuing with the above example, the first CPE hook 312 causes the first thread 302 to stall so that the second predicate p2 can be evaluated in the second thread 304. In the illustrated example of FIG. 3, the second thread 304 acquires a lock at line $L_3$ to prevent any other threads from accessing the memory location associated with variable y, and then evaluates the conditions of the second predicate p2 at the second CPE hook 314. In this example, because the value of variable y is zero, the second predicate p2 is true and the example CPE 308 is deemed satisfied. As a result of satisfying the example CPE 308, a warning message and/or other exception may be invoked to alert the software engineer of the concurrency violation and its corresponding location relative to the first thread 302 and the second thread 304. When such circumstances are identified by example methods, apparatus, systems and/or articles of manufacture disclosed herein, the software engineer may identify one or more changes to the example multi-threaded application 300 that may be made to prevent concurrency errors. In the example multi-threaded application 300 of FIG. 3, the software engineer may now identify that relocating lines $L_7$-$L_9$ of the first thread 302 between lines $L_2$ and $L_3$ will prevent the divide-by-zero error from occurring in the future.

Figure 4:
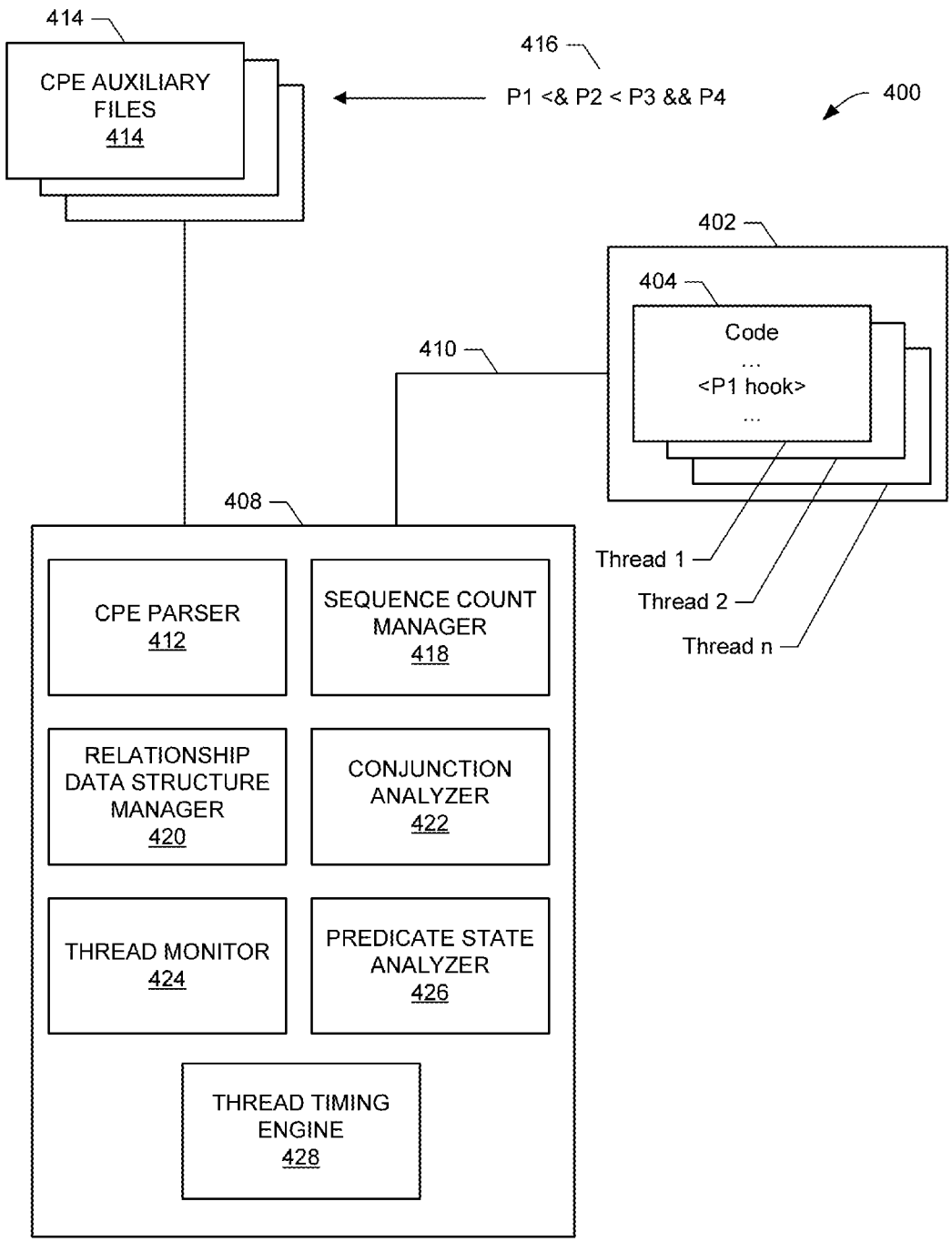
FIG. 4 is a schematic illustration of an example concurrent predicate expression runtime system to manage concurrent predicate expressions and identify concurrency violations in multi-threaded programs.

FIG. 4 illustrates an example CPE runtime (RT) happens-before (HB) system 400, hereinafter referred to as the CPE-RT system 400. In the illustrated example of FIG. 4, the CPE-RT system 400 includes a computing system 402 capable of executing one or more threads 404, in which each of the one or more threads 404 may include a CPE hook 406. While the example computing system 402 is communicatively connected to a CPE engine 408 via a communication bus 410, the example CPE engine may, alternatively, operate as part of the computing system 402. The example CPE engine includes a CPE parser 412 communicatively connected to one or more CPE auxiliary files 414, in which each CPE auxiliary file 414 may include one or more expression strings 416 (e.g., p1<& p2<p3 && p4). The example CPE engine 408 also includes a sequence count manager 418, a relationship data structure manager 420, a conjunction analyzer 422, a thread monitor 424, a predicate state analyzer 426 and a thread timing engine 428.

In operation, the example CPE-RT system 400 both (a) builds one or more data structures indicative of predicate satisfaction status and (b) monitors the one or more threads 404 for predicate status information. The example CPE parser 412 evaluates the CPE auxiliary file 414 if it is available and/or otherwise not previously evaluated. While parsing the example CPE auxiliary file 414, the example CPE parser 412 identifies a predicates in the expression string 416 associated with the auxiliary file 414, and the example sequence count manager 418 identifies a corresponding order for each identified predicate of a given string. In the illustrated example of FIG. 4, the first predicate in the example expression string 416 is p1, the second predicate is p2, the third predicate is p3 and the fourth predicate is p4.

The example relationship data structure manager 420 generates a relationship data structure based on available expression strings, and an example relationship data structure 500 is shown in FIG. 5. In the illustrated example of FIG. 5, the relationship data structure identifies predicates that are to be satisfied, an order in which predicates are to be satisfied, and whether each predicate status is either satisfied or not-satisfied (unsatisfied). In other words, the example relationship data structure 500 represents a predicate status structure showing predicates to satisfy and whether the predicates are currently satisfied in the order indicative of the expression string (e.g., the expression string 416). The example predicate status structure 500 includes an order column 502, a predicate name column 504, a predicate value column 506, a concurrency flag column 508, a concurrency value column 510 and a satisfied status column 512.

The example predicate status structure 500 is generated by the example relationship data structure manager 420 to allow one or more CPE hooks 406 of the one or more threads 404 of the example computing system 402 to be monitored for instances of concurrency violations. In other words, the example predicate status structure 500 operates as a roadmap of ordered predicates and their corresponding state of satisfaction. In the event that the example predicate status structure 500 is not fully satisfied, then the corresponding multi-threaded program (e.g., threads 404) executed by the example computing system 402 is deemed to be bug free. However, just because one or more iterations of the example threads 404 do not result in one or more concurrency violations is not indicative of bug-free code. As described above and in further detail below, one or more concurrency violations may not be invoked based on, for example, relative times of thread execution within the multi-threaded application.

After the example sequence count manager 418 identifies a sequence order for a given predicate (e.g., p1 is associated with the first predicate to be satisfied), the example conjunction analyzer 422 determines the type of sequential relationship between the first predicate and a subsequent predicate. In the illustrated example of FIG. 4, the conjunction analyzer 422 identifies the "<&" operation from the example expression string 416 to indicate that p1 is to be satisfied immediately prior to predicate p2, and that p1 must remain in its satisfied state (e.g., with a corresponding value y==0) up and until predicate p2 is satisfied. The example CPE parser 412 then determines whether one or more additional predicates remain in the example expression string and, if so, attributes the next available sequence number to the subsequent predicate. After the example predicate status structure 500 is populated with an ordered set of predicates, their associated relationships to subsequent predicates, required behaviors of concurrency and corresponding concurrency values, the example thread monitor 424 monitors the example threads 404 for an instance of execution.

If the example thread monitor 424 detects that the example threads 404 are executing, the thread monitor 424 sets a predicate pointer to determine which predicate requires satisfaction. For example, the example thread monitor 424 may set a pointer to a value of one to indicate the first predicate has not yet been confirmed as satisfied, but because p1 is the first predicate in the example status structure 500, no subsequent threads may be evaluated until predicate p1 is satisfied. When the example predicate state analyzer 426 determines predicate p1 is satisfied (e.g., because y==0 at a CPE hook associated with p1), the example relationship data structure manager 420 updates the example satisfied column 512 with an indication of satisfied (e.g., "true," "1," "T," etc.).

For circumstances in which a prior predicate value must be satisfied and stay satisfied (e.g., p1<& p2), then the example predicate state analyzer 426 monitors a previously satisfied predicate to verify that its state has not changed and/or otherwise altered. If it has, such as if the value of y in the example multi-threaded application 300 of FIG. 3 changes from a value of zero to a non-zero value after the first CPE hook 312 is deemed satisfied, but before the second CPE hook 314 can be evaluated, then the example relationship data structure manager 420 removes the indication of satisfied (e.g., "true," "1," "T," etc.) from the satisfied column 512 and replaces it with an indication of unsatisfied (e.g., "false," "0," "F," etc.). Additionally, the example predicate state analyzer 426 returns its pointer value to that associated with the unsatisfied predicate to allow the threads 404 to be monitored for the proper predicate sequence.

When the example thread monitor 424 returns to monitoring the threads 404 for another instance of predicate satisfaction (e.g., a value of variable y switching from a non-zero value to a zero value), the example thread timing engine 428 may apply a sleep value to one or more of the example threads 404 before allowing them to execute again. As described above, some multi-threaded programs may not exhibit a concurrency violation because the relative timing between individual thread executions does not invoke such erroneous conditions. As such, the example thread timing engine 428 may apply the sleep value to stagger the initiation of one or more of the threads 404 by a duration value (e.g., a constant value, a random value) in an effort to inject timing variation in the one or more threads. Such delay duration values (sleep values) may be applied to just one of the executing threads 404, multiple ones of the executing threads 404, or all of the executing threads 404 may be subjected to the delay duration values equally.

Figure 6A:
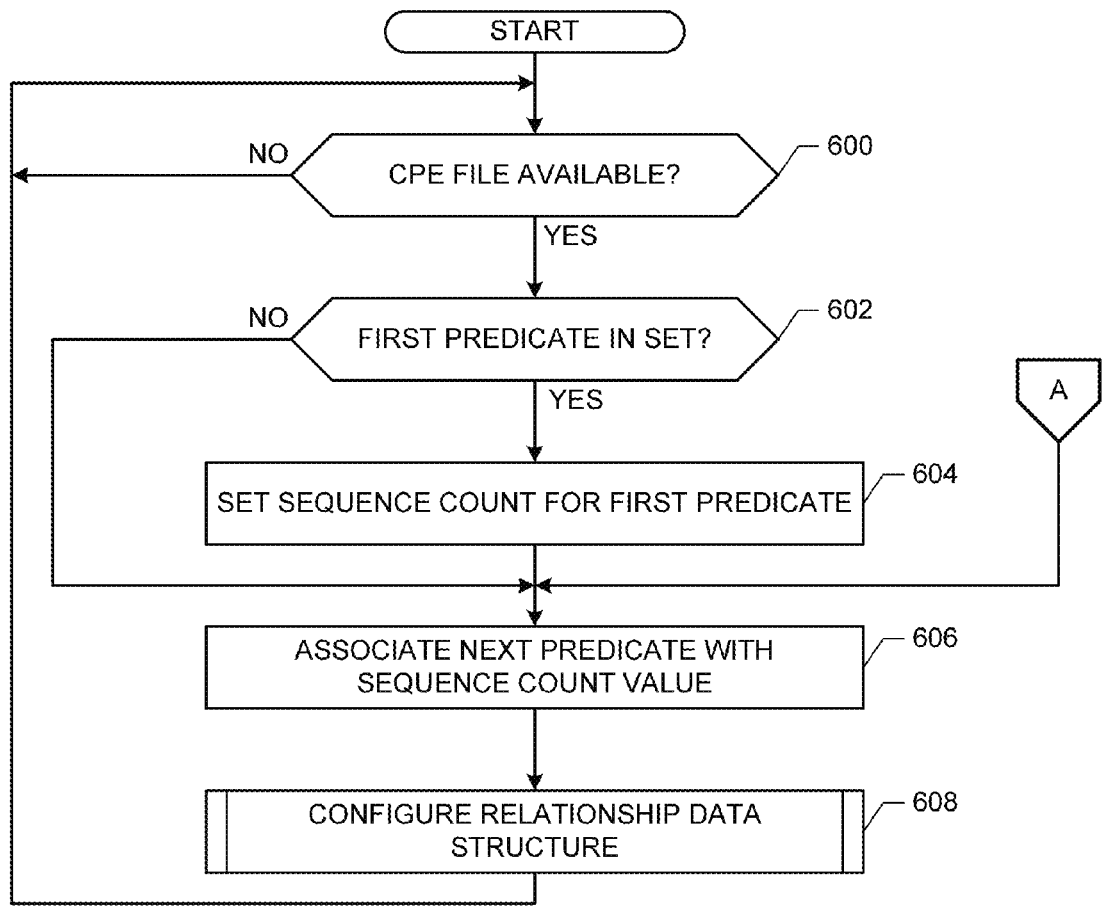
FIGS. 6A, 6B and 7 are flowcharts representative of example machine readable instructions which may be executed to manage concurrent predicate expressions.
Figure 6B:
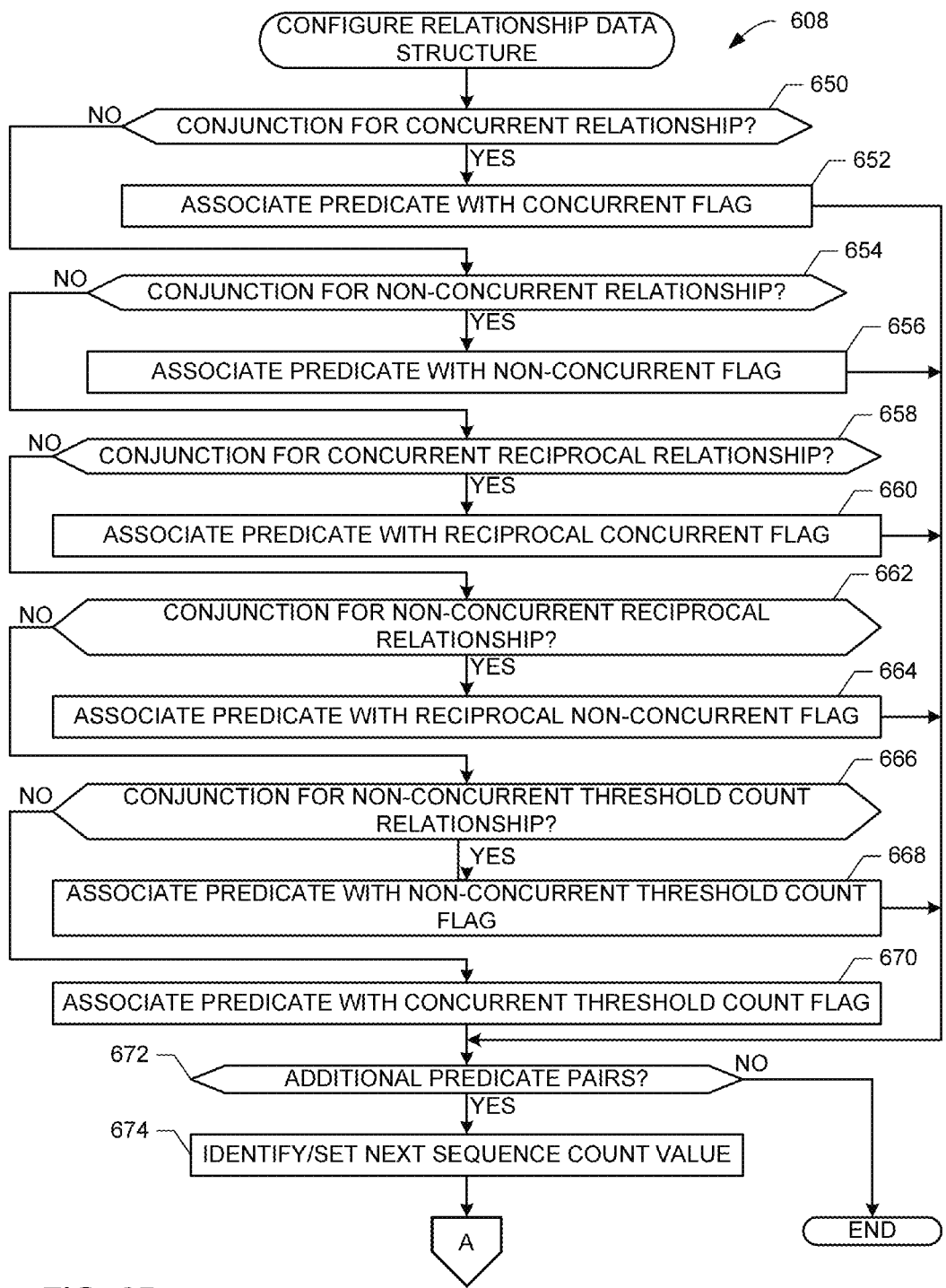
Figure 7:
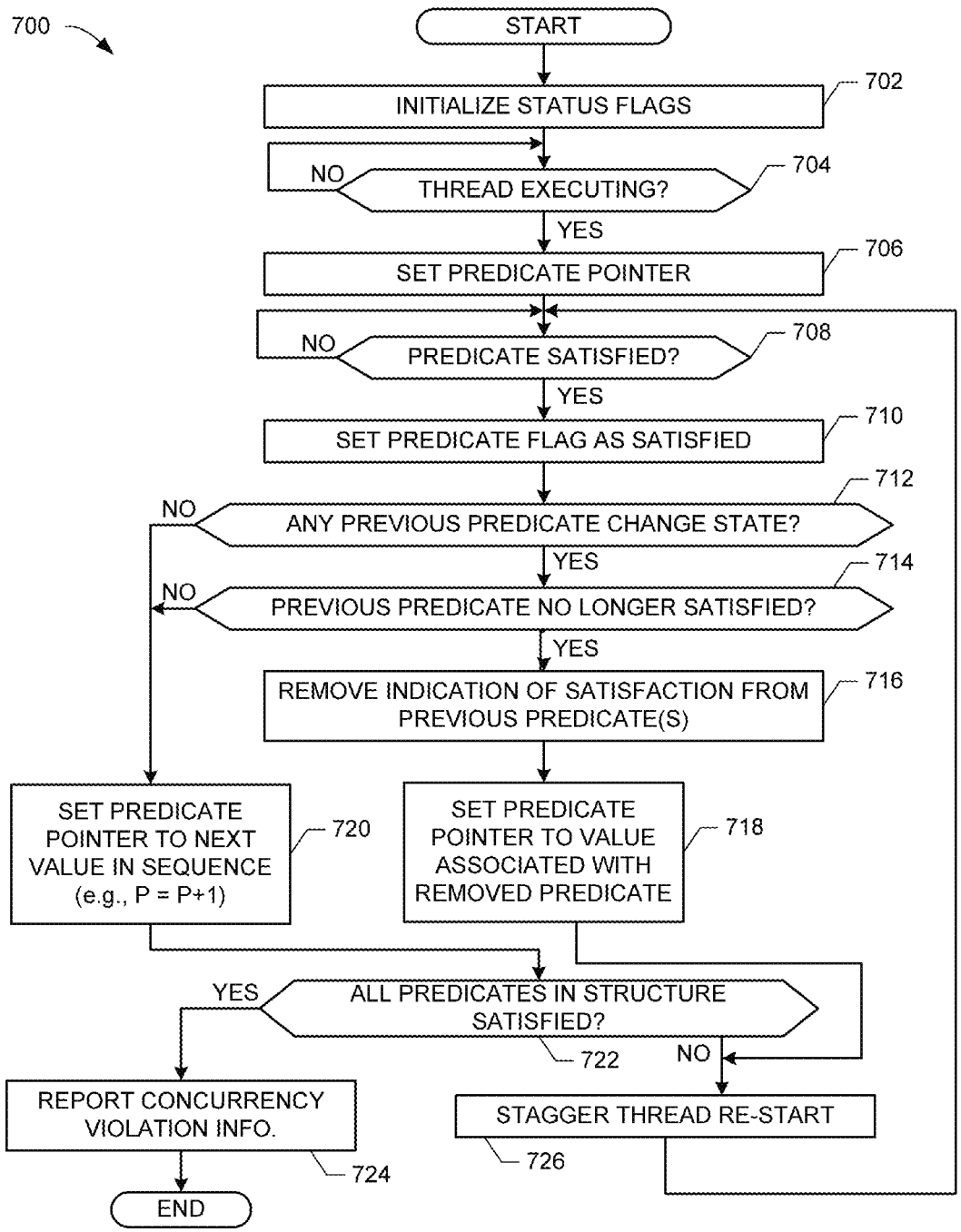

While an example manner of implementing the CPE-RT system 400 of FIGS. 4 and 5 are illustrated in FIGS. 6A, 6B and 7, one or more of the elements, processes and/or devices illustrated in FIGS. 6A, 6B and 7 may be combined, divided, re-arranged, omitted, eliminated and/or implemented in any other way. Further, the example computing system 402, the example CPE engine 408, the example CPE parser 412, the example CPE auxiliary files 414, the example expression strings 416, the example sequence count manager 418, the example relationship data structure manager 420, the example conjunction analyzer 422, the example thread monitor 424, the example predicate state analyzer 426, the example thread timing engine 428 and/or, more generally, the example CPE-RT system 400 and the example predicate status structure 500 of FIGS. 4 and 5 may be implemented by hardware, software, firmware and/or any combination of hardware, software and/or firmware. Thus, for example, any of the example computing system 402, the example CPE engine 408, the example CPE parser 412, the example CPE auxiliary files 414, the example expression strings 416, the example sequence count manager 418, the example relationship data structure manager 420, the example conjunction analyzer 422, the example thread monitor 424, the example predicate state analyzer 426, the example thread timing engine 428 and/or, more generally, the example CPE-RT system 400 and the example predicate status structure 500 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example, computing system 402, the example CPE engine 408, the example CPE parser 412, the example CPE auxiliary files 414, the example expression strings 416, the example sequence count manager 418, the example relationship data structure manager 420, the example conjunction analyzer 422, the example thread monitor 424, the example predicate state analyzer 426, the example thread timing engine, the example CPE-RT system 400, and/or example predicate status structure 500 are hereby expressly defined to include a tangible computer readable storage device or storage disc such as a memory, DVD, CD, Blu-ray, etc. storing the software and/or firmware. Further still, the example CPE-RT system 400 and/or the example predicate status structure 500 of FIGS. 4 and 5 may include one or more elements, processes and/or devices in addition to, or instead of, those illustrated in FIGS. 4 and 5, and/or may include more than one of any or all of the illustrated elements, processes and devices.

Flowcharts representative of example machine readable instructions for implementing the CPE-RT system 400 and/or the example predicate status structure 500 of FIGS. 4 and 5 are shown in FIGS. 6A, 6B and 7. In this example, the machine readable instructions comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 6A, 6B and 7, many other methods of implementing the example CPE-RT system 400 and/or the example predicate status structure 500 may alternatively be used. For example, the order of execution of the blocks may be changed, and/or some of the blocks described may be changed, eliminated, or combined.

As mentioned above, the example processes of FIGS. 6A, 6B and 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 6A, 6B and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

The program of FIG. 6A begins at block 600, in which the example CPE parser 412 determines whether one or more example CPE auxiliary files 414 are available. If not, then the example CPE parser 412 waits until one or more files 414 are available, otherwise the example CPE parser 412 determines whether a predicate from the example CPE auxiliary file 414 is a first predicate in a set (block 602). If so, then the example sequence count manager 418 associates the first predicate with an associated sequence count of one (block 604). Additionally, the example sequence count manager 418 associates a next predicate with the next highest available value of the sequence count (block 606) (e.g., count=count+1) so that each predicate in a set has an associated count value indicative of a required order of satisfaction to induce a violation. The example relationship data structure manager 420 configures a relationship data structure (block 608), such as the example predicate status structure 500 described in connection with FIG. 5.

FIG. 6B, includes additional detail associated with configuring the relationship data structure (block 608). In the illustrated example of FIG. 6B, the example conjunction analyzer 422 determines whether an operator from the example CPE auxiliary file 414 is associated with a concurrent relationship (block 650). If so, then the example relationship data structure manager 420 updates a concurrency flag of the example predicate status structure 500 to reflect any happens-before temporal requirements of predicate satisfaction (block 652). As described above in connection with FIG. 2, a concurrent relationship may be identified via the example operator/conjunction "<&". If the example conjunction analyzer 422 determines that the operator from the example CPE auxiliary file 414 is not associated with a concurrent relationship (block 650), then the example conjunction analyzer determines whether the operator is associated with a non-concurrent ordered relationship (block 654). If so, then the example relationship data structure manager 420 updates a concurrency flag of the example predicate status structure 500 to reflect a non-concurrence relationship having an order requirement (block 656).

If the example conjunction analyzer 422 determines that the operator from the example CPE auxiliary file 414 is not associated with a non-concurrent ordered relationship (block 654), then the example conjunction analyzer 422 determines whether the operator is associated with a concurrent relationship of a reciprocal order (block 658). As described above, a reciprocal concurrent expression uses the operator "&&". If so, then the example relationship data structure manager 420 updates concurrency flags of the example predicate status structure 500 to reflect the reciprocal concurrence relationship (block 660). If the example conjunction analyzer 422 determines that the operator from the example CPE auxiliary file 414 is not associated with a reciprocal concurrent relationship (block 658), then the example conjunction analyzer 422 determines whether the operator is associated with a non-concurrent reciprocal relationship (block 662). As described above, the example reciprocal non-concurrent expression uses the operator "∥". If so, then the example relationship data structure manager 420 updates concurrency flags of the example predicate status structure 500 to reflect the reciprocal non-concurrent relationship (block 664).

If the example conjunction analyzer 422 determines that the operator from the example CPE auxiliary file 414 is not associated with a reciprocal non-concurrent relationship (block 662), then the example conjunction analyzer 422 determines whether the operator is associated with a non-concurrent threshold count relationship (block 666). As described above, the example non-concurrent threshold count relationship is identified by the use of the operator "#." If so, then the example relationship data structure manager 420 updates concurrency flags to reflect a non-concurrent iteration of a threshold value (block 668). If the example conjunction analyzer 422 determines that the operator from the example CPE auxiliary file 414 is not associated with a non-concurrent threshold count relationship (block 666), then the example conjunction analyzer 422 determines that the operator is associated with a concurrent threshold relationship in response to identifying the operator "^" and the example relationship data structure manager 420 updates the predicate status structure 500 to reflect a need to count a threshold number of concurrent instances of a particular predicate (block 670).

In the event there are additional predicate pairs that are separated by an operator in the example expression string 416 (block 672) (e.g., p3 && p4), then the example sequence count manger 418 identifies associated next sequence count values (block 674). For example, in view of the example expression string 416, if the first pair of predicates p1 and p2 have been evaluated with respect to each other, their corresponding sequence count values are "1" and "2" respectively, making "3" and "4" the subsequent sequence count values for predicates p3 and p4. Control then advances to block 606 of FIG. 6A. On the other hand, in the event the full set of predicates and associated conjunctions have been evaluated (block 672), then the program ends to allow runtime evaluation of the example predicate status structure 500 to occur.

FIG. 7 illustrates a generic runtime program 700 to evaluate one or more threads in a multi-threaded application to be evaluated in view of the configured predicate status structure 500. In the illustrated example of FIG. 7, the example relationship data structure manager 420 initializes status flags of the example predicate status structure 500 prior to execution of one or more threads 404 of the example computing system 402 under evaluation (block 702). Initialization of the status flags (block 702) may occur by setting all values of the example satisfied status column 512 to an indication of "not satisfied" (e.g., "false," "not satisfied," "0," etc.). In some examples, the values in the example satisfied status column 512 may be set to "TBD" to refer to a status of "to be determined." If the example thread monitor 424 determines that none of the threads 404 is executing (block 704), the example program 700 waits, otherwise the example thread monitor 424 sets a predicate pointer p to a value of the first predicate to be evaluated (e.g., pointer p==1) (block 706).

The example predicate state analyzer 426 monitors for an instance when the predicate of interest (e.g., predicate p1 associated with pointer p==1) is satisfied (e.g., predicate p1=0) (block 708). The example program 700 waits until the predicate of interest is satisfied (block 708) and the example relationship data structure manager 420 changes the satisfied status column 512 from, for example, "TBD" to "TRUE" (block 710) when the predicate of interest is satisfied (block 708). However, because some concurrency violations depend on a prior predicate state being maintained until a subsequent state is satisfied (e.g., p1<& p2), then the example predicate state analyzer 420 determines whether any previous predicate has changed state (block 712). Even if a prior predicate has changed state as determined by the example predicate state analyzer 426 (block 712), the example predicate state analyzer 426 also determines whether such a change of state affects the determination of whether a concurrency violation is true by referencing the conjunction between the relevant pair of predicates (block 714). For example, predicate expressions that are ordered but not concurrent (e.g., p1<p2) may revert back to any value without affecting the requirements to identify a concurrency violation. On the other hand, predicate expressions that are ordered and concurrent (e.g., p1<& p2) must maintain their satisfied state until the next predicate is satisfied. In other words, if predicate p1 is satisfied first in response to a variable value equaling zero (e.g., y==0), then that variable must maintain its value of zero until the conditions of predicate p2 are satisfied.

In the event the example predicate state analyzer 426 determines that the previously satisfied predicate is no longer satisfied (block 714), then the example relationship data structure manager 420 modifies the satisfied status column 512 to reflect that the previous predicate is not satisfied (block 716) (e.g., "TBD," "FALSE," "0," etc.). The example predicate state analyzer 426 resets the predicate pointer to a value associated with the predicate that is no longer satisfied (block 718) so that subsequent predicates that may be in the example expression string 416 are not evaluated out of turn. In the event none of the previously satisfied predicates have changed state (block 712), then the example predicate state analyzer 426 sets the predicate pointer to the next value in the sequence of predicates to evaluate (block 720) (e.g., p=p+1). The example relationship data structure manager 420 determines whether all predicates in the example predicate status structure 500 have been satisfied (block 722) and, if so, the example CPE engine 408 reports a concurrency violation has occurred (block 724).

If the example relationship data structure manager 420 determines that all of the predicates in the example predicate status structure 500 have not been satisfied (block 722), then the example thread timing engine 428 applies a thread re-start delay factor (block 726). As described above, in some circumstances two or more threads may execute in a relative temporal synchronicity that either (a) always results in concurrency violations, (b) never causes concurrency violations or (c) intermittently causes concurrency violations. To expose the potential for such circumstances to hide the possibility of a concurrency violation, the example thread timing engine 428 applies a delay value to one or more threads that expires before allowing the one or more threads to begin execution. In some examples, the delay value is random, thereby allowing the one or more threads 404 to begin execution at differing times with respect to each other between iterations. Such random start times for each of the threads may expose one or more circumstances where a concurrency violation occurs, thereby allowing specific portions of the code to be evaluated and/or changed to prevent such violations from occurring in the future.

Figure 8:
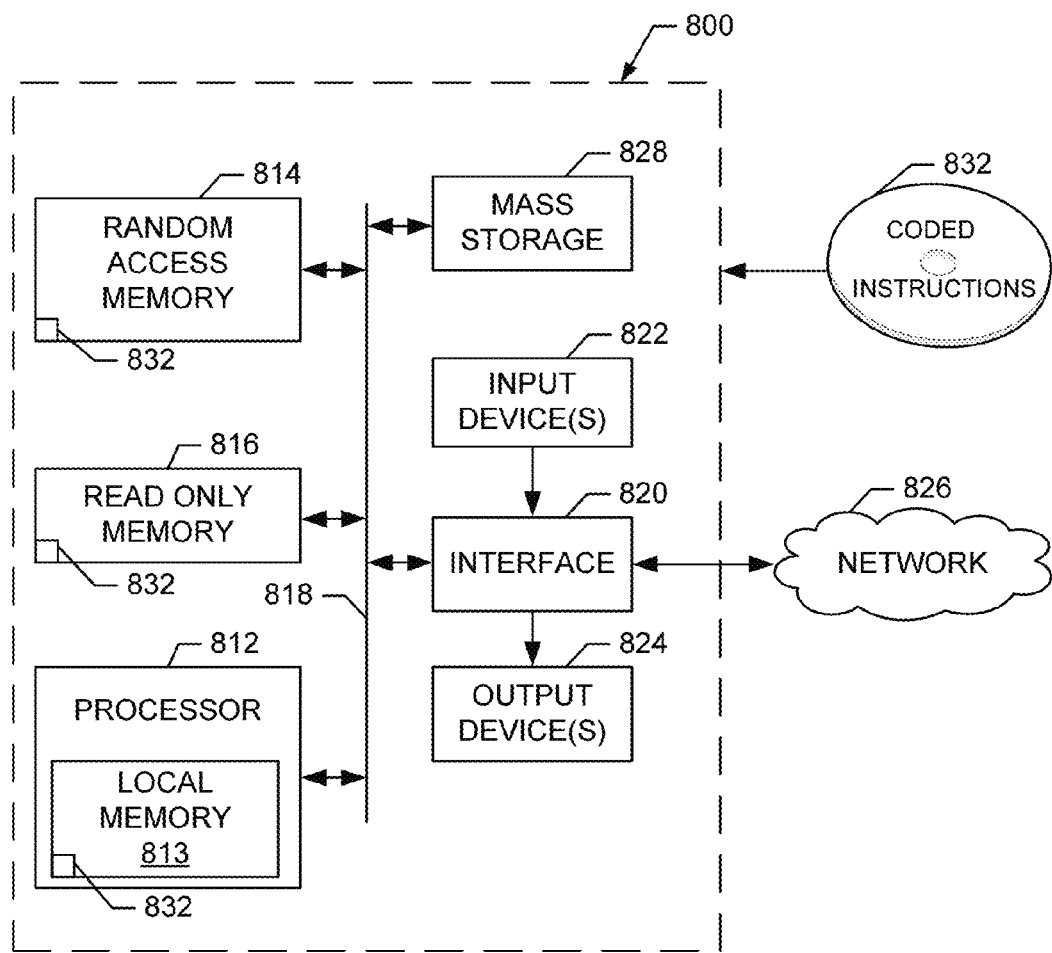
FIG. 8 is a block diagram of an example processor platform that may execute the example machine readable instructions of FIGS. 6A, 6B and 7 to implement the example concurrent predicate expression runtime system of FIG. 4 and the example data structure of FIG. 5.

FIG. 8 is a block diagram of an example processor platform 800 capable of executing the instructions of FIGS. 6A, 6B and 7 to implement the apparatus of FIGS. 4 and 5. The processor platform 800 can be, for example, a server, a personal computer, a mobile device (e.g., a tablet such as an iPad™), a personal digital assistant (PDA), an Internet appliance, a gaming console, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit a user to enter data and commands into the processor 812. The input device(s) can be implemented by, for example, a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 6A, 6B and 7 may be stored in the mass storage device 828, in the volatile memory 814, in the non-volatile memory 816, and/or on a removable tangible computer readable storage medium such as a CD or DVD.

From the foregoing, it will appreciate that the above disclosed methods, apparatus and articles of manufacture facilitate multi-threaded program debugging in a manner that exposes concurrency violations. Additionally, in the event initial assumptions regarding concurrency violations is incorrect via the one or more CPE auxiliary files 414, such files may be changed to search for differing concurrency violation patterns without code recompiling efforts.

Methods, apparatus, systems and articles of manufacture are disclosed to manage concurrent predicate expressions. Some disclosed example methods include inserting a first condition hook into a first thread, the first condition hook associated with a first condition, inserting a second condition hook into a second thread, the second condition hook associated with a second condition, preventing the second thread from executing until the first condition is satisfied, and identifying a concurrency violation when the second condition is satisfied. Other disclosed example methods include preventing the second thread from executing until the first condition is satisfied further by allowing the second thread to execute only when the first condition is satisfied. Some disclosed example methods include preventing the second thread from executing and re-initiating the first thread when the first condition is not satisfied prior to the second condition being satisfied. Still other example methods include the first and second conditions indicating a concurrency error when the first and second conditions are satisfied in a first order, and wherein the first order includes the first condition being satisfied prior to the second condition and remaining satisfied until the second condition is satisfied. Still other example disclosed methods include changing a satisfaction order of the first and second conditions without recompiling the first and second threads. Some disclosed example methods also include applying a thread re-start delay when the first or second thread executes without satisfying the first or second condition, and wherein the thread re-start delay comprises a random time duration for at least one of the first thread or the second thread. Other disclosed example methods include invoking a warning message in response to identifying the concurrency violation via a warning message associated with error location information.

Example apparatus to detect a concurrency violation include a concurrent predicate expression (CPE) engine to insert a first condition hook into a first thread associated with a first condition, and to insert a second condition hook into a second thread associated with a second condition, a thread monitor to prevent the second thread from executing until the first condition is satisfied, and a predicate state analyzer to identify a concurrency violation when the second condition is satisfied. Other disclosed example apparatus include the thread monitor to prevent the second thread from executing until the first condition is satisfied by allowing the second thread to execute only when the first condition is satisfied. Still other example disclosed apparatus include the thread monitor to prevent the second thread from executing and re-initiating the first thread when the first condition is not satisfied prior to the second condition being satisfied. Some example disclosed apparatus include a sequence count manager to identify a concurrency error when the first and second conditions are satisfied in a first order, wherein the sequence count manager is to identify the first order as the first condition being satisfied prior to the second condition and to identify the first condition remaining satisfied until the second condition is satisfied. Other example disclosed apparatus include a CPE parser to detect a change in a satisfaction order of the first and second conditions without recompiling the first and second threads. Some disclosed example apparatus include a thread timing engine to apply a thread re-start delay when the first or second thread executed without satisfying the first or second condition, wherein the thread timing engine is to apply a random time duration for at least one of the first thread or the second thread. Other disclosed example apparatus include the predicate state analyzer to invoke a warning message associated with error location information in response to identifying when the second condition is satisfied.

Some disclosed example machine readable storage mediums include instructions that, when executed, cause a machine to insert a first condition hook into a first thread, the first condition hook associated with a first condition, insert a second condition hook into a second thread, the second condition hook associated with a second condition, prevent the second thread from executing until the first condition is satisfied, and identify a concurrency violation when the second condition is satisfied. Other example disclosed machine readable storage mediums include instructions to cause the machine to prevent the second thread from executing until the first condition is satisfied by allowing the second thread to execute only when the first condition is satisfied, and to cause the machine to prevent the second thread from executing and re-initiating the first thread when the first condition is not satisfied prior to the second condition being satisfied. Still other example disclosed machine readable storage mediums include instructions that cause the machine to identify a concurrency error when the first and second conditions are satisfied in a first order, and to cause the machine to identify the first condition being satisfied prior to the second condition while the first condition remains satisfied until the second condition is satisfied. Some example disclosed machine readable storage mediums include instructions that cause a machine to change a satisfaction order of the first and second conditions without recompiling the first and second threads. Other example disclosed machine readable storage mediums include instructions that cause a machine to apply a thread re-start delay when the first or second thread executes without satisfying the first or second condition, and to cause the machine to apply a random time duration for at least one of the first thread or the second thread. Other disclosed example machine readable storage mediums include invoking a warning message associated with error location information.

Some disclosed methods include a method implemented by one or more processors, that includes populating, with at least one of the processors, a non-compiled auxiliary file with a first predicate expression; inserting, with at least one of the processors, a first condition hook into a first thread and a second condition hook into a second thread, the first condition hook invoking the first predicate expression during execution of the first thread, and the second condition hook invoking the first predicate expression during execution of the second thread; when the first predicate expression is not satisfied at a first time, replacing, with at least one of the processors, the first predicate expression in the non-compiled auxiliary file with a second predicate expression; and invoking, with at least one of the processors, the second predicate expression during execution of the first and the second threads at a second time to identify a predicate order responsible for a thread concurrency error.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method implemented by one or more processors, comprising:
   populating, with at least one of the processors, a non-compiled auxiliary file with a first predicate expression;
   inserting, with at least one of the processors, a first condition hook into a first thread and a second condition hook into a second thread, the first condition hook invoking the first predicate expression during execution of the first thread, and the second condition hook invoking the first predicate expression during execution of the second thread;
   when the first predicate expression is not satisfied at a first time, replacing, with at least one of the processors, the first predicate expression in the non-compiled auxiliary file with a second predicate expression; and
   invoking, with at least one of the processors, the second predicate expression during execution of the first and the second thread at a second time to identify a predicate order responsible for a thread concurrency error.

2. The computer implemented method as defined in claim 1, wherein the first predicate expression includes a first predicate and a second predicate in a first order.

3. The computer implemented method as defined in claim 2, further including identifying a thread concurrency error when the first order is satisfied during execution of the first thread and during execution of the second thread at the first time.

4. The computer implemented method as defined in claim 2, further including determining whether the first predicate expression is satisfied at the first time by:
   stalling the first thread in response to detecting the first predicate is satisfied; and
   determining whether the second predicate is satisfied in the second thread.

5. The computer implemented method as defined in claim 4, further including identifying the predicate order causing the thread concurrency error when the second predicate is satisfied in the second thread.

6. The computer implemented method as defined in claim 5, further including generating a warning message to identify a location of the thread concurrency error.

7. The computer implemented method as defined in claim 2, wherein the first order requires that the first predicate is satisfied prior to the second predicate being satisfied, and the first predicate stays satisfied while the second predicate is satisfied.

8. The computer implemented method as defined in claim 2, wherein the first order requires that the first predicate is satisfied prior to the second predicate being satisfied, and the first predicate is at least one of satisfied or not satisfied when determining whether the second predicate is satisfied.

9. The computer implemented method as defined in claim 1, wherein the first thread and the second thread are not compiled when the second predicate expression is evaluated at the second time.

10. An apparatus to identify a predicate order responsible for a thread concurrency error, the apparatus comprising:
    at least one processor; and
    memory, the memory to store computer program instructions, the computer program instructions when executed by the at least one processor cause the at least one processor to implement:
    a concurrent predicate expression (CPE) engine to:
      populate a non-compiled auxiliary file with a first predicate expression;
      insert a first condition hook into a first thread and a second condition hook into a second thread, the first condition hook to invoke the first predicate expression during execution of the first thread, and the second condition hook to invoke the first predicate expression during execution of the second thread;
      when the first predicate expression is not satisfied at a first time, replace the first predicate expression in the non-compiled auxiliary file with a second predicate expression; and
    a sequence count manager to invoke the second predicate expression during execution of the first and the second thread at a second time to identify a predicate order responsible for a thread concurrency error.

11. The apparatus as defined in claim 10, wherein the first predicate expression includes a first predicate and a second predicate in a first order.

12. The apparatus as defined in claim 11, wherein the sequence count manager is to identify a thread concurrency error when the first order is satisfied during execution of the first thread and during execution of the second thread at the first time.

13. The apparatus as defined in claim 11, further including a thread monitor to stall the first thread in response to detecting the first predicate is satisfied, and the sequence count manager to determine whether the second predicate is satisfied in the second thread to identify whether the first predicate expression is satisfied at the first time.

14. The apparatus as defined in claim 13, wherein the sequence count manager is to identify the predicate order causing the thread concurrency error when the second predicate is satisfied in the second thread.

15. The apparatus as defined in claim 14, further including a predicate state analyzer to generate a warning message to identify a location of the thread concurrency error.

16. At least one tangible computer readable storage medium comprising instructions, which when executed, cause at least one machine to at least:
    populate a non-compiled auxiliary file with a first predicate expression;

insert a first condition hook into a first thread and a second condition hook into a second thread, the first condition hook invoking the first predicate expression during execution of the first thread, and the second condition hook invoking the first predicate expression during execution of the second thread;

when the first predicate expression is not satisfied at a first time, replace the first predicate expression in the non-compiled auxiliary file with a second predicate expression; and invoke the second predicate expression during execution of the first and the second thread at a second time to identify a predicate order responsible for a thread concurrency error.

17. The at least one computer readable storage medium as defined in claim 16, wherein the instructions, when executed, cause the at least one machine to identify a thread concurrency error when a first order is satisfied during execution of the first thread and during execution of the second thread at the first time.

18. The at least one computer readable storage medium as defined in claim 16, wherein the instructions, when executed, cause the at least one machine to determine whether the first predicate expression is satisfied at the first time by:

stalling the first thread in response to detecting a first predicate is satisfied; and determining whether a second predicate is satisfied in the second thread.

19. The at least one computer readable storage medium as defined in claim 18, wherein the instructions, when executed, cause the at least one machine to identify the predicate order causing the thread concurrency error when the second predicate is satisfied in the second thread.

20. The at least one computer readable storage medium as defined in claim 19, wherein the instructions, when executed, cause the at least one machine to generate a warning message to identify a location of the thread concurrency error.

* * * * *